(12) United States Patent
Okamoto et al.

(10) Patent No.: US 11,602,705 B2
(45) Date of Patent: *Mar. 14, 2023

(54) FILTRATION DEVICE

(71) Applicant: YAMASHIN-FILTER CORP., Kanagawa (JP)

(72) Inventors: Mitsunobu Okamoto, Kanagawa (JP); Masanori Wakabayashi, Kanagawa (JP); Shinya Hirose, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 268 days.

This patent is subject to a terminal disclaimer.

(21) Appl. No.: 16/920,102

(22) Filed: Jul. 2, 2020

(65) Prior Publication Data

US 2020/0330908 A1   Oct. 22, 2020

Related U.S. Application Data

(63) Continuation of application No. PCT/JP2019/000085, filed on Jan. 7, 2019.

(30) Foreign Application Priority Data

Jan. 16, 2018   (JP) .............................. JP2018-005227

(51) Int. Cl.
 *B01D 29/19*   (2006.01)
 *B01D 35/30*   (2006.01)

(52) U.S. Cl.
 CPC .............. *B01D 29/19* (2013.01); *B01D 35/30* (2013.01); *B01D 2201/306* (2013.01)

(58) Field of Classification Search
 CPC .............. B01D 29/15; B01D 2201/291; B01D 2201/347; B01D 2201/0415
 See application file for complete search history.

(56) References Cited

U.S. PATENT DOCUMENTS

| 6,347,712 B1 | 2/2002 | Mees et al. | |
|---|---|---|---|
| 2004/0154975 A1* | 8/2004 | Girondi ................. | F02M 37/42 210/450 |
| 2005/0000885 A1 | 1/2005 | Stockbower | |

(Continued)

FOREIGN PATENT DOCUMENTS

| DE | 1430341 A1 | 3/1995 |
|---|---|---|
| JP | S60-168593 U | 11/1985 |

(Continued)

OTHER PUBLICATIONS

Extended European Search Report issued in European Patent Application No. EP19741057.4, dated Feb. 9, 2021 (6 pages).

(Continued)

*Primary Examiner* — Benjamin M Kurtz

(74) *Attorney, Agent, or Firm* — Nakanishi IP Associates, LLC

(57) ABSTRACT

A protruding portion is formed on an inner tube inserted into a hollow portion of a filter medium so as to protrude upward from a flange portion. The flange portion having a substantially circular plate shape is disposed on a lower side of a second plate. A recessed portion into which the protruding portion is inserted is formed on a surface on a lower side of the second plate provided so as to cover an opening at a lower end of the filter medium.

8 Claims, 12 Drawing Sheets

(56) References Cited

U.S. PATENT DOCUMENTS

| | | |
|---|---|---|
| 2005/0178714 A1 | 8/2005 | Stockbower |
| 2009/0008320 A1 | 1/2009 | Harder et al. |
| 2013/0228504 A1 | 9/2013 | McElroy et al. |
| 2013/0270162 A1 | 10/2013 | Ardes |
| 2016/0271533 A1* | 9/2016 | Honermann ......... B01D 35/153 |
| 2017/0312664 A1 | 11/2017 | Girondi |
| 2018/0093208 A1 | 4/2018 | Tachibana |
| 2019/0046903 A1 | 2/2019 | Boden et al. |

FOREIGN PATENT DOCUMENTS

| | | |
|---|---|---|
| JP | 2000-508228 A | 7/2000 |
| JP | 2001-286708 A | 10/2001 |
| JP | 2005-521546 A | 7/2005 |
| JP | 2005-288293 A | 10/2005 |
| JP | 2010-042336 A | 2/2010 |
| JP | 3185612 U | 8/2013 |
| JP | 2017-042754 A | 3/2017 |
| WO | 2006/078587 A2 | 7/2006 |
| WO | 2012/085193 A1 | 6/2012 |
| WO | 2016/087916 A1 | 6/2016 |
| WO | 2016/174777 A1 | 11/2016 |
| WO | 2016/194946 A1 | 12/2016 |
| WO | 2017/050367 A1 | 3/2017 |

OTHER PUBLICATIONS

Office Action issued in Chinese Patent Application No. 201980006943.6 dated Mar. 25, 2022 with English Translation (13 pages).
International Search Report issued in PCT/JP2019/000085 dated Apr. 2, 2019 with English Translation (5 pages).
Office Action issued in Chinese Patent Application No. 201980006943.6 dated Sep. 2, 2021 with English Translation (15 pages).
International Search Report issued in PCT/JP2019/000084 dated Apr. 2, 2019 with English Translation (5 pages).
Extended European Search Report issued in European Patent Application No. EP19740759.6, dated Feb. 9, 2021 (7 pages).
Office Action issued in Japanese Patent Application No. 2018-005226 dated Dec. 7, 2021 with English Translation (10 pages).
Office Action issued in Japanese Patent Application No. 2018-005227 dated Dec. 7, 2021 with English Translation (9 pages).

* cited by examiner

FILTRATION DEVICE

CROSS-REFERENCE TO RELATED APPLICATIONS

This application is a continuation application of International Patent Application No. PCT/JP2019/000085 filed on Jan. 7, 2019, which claims priority to Japanese Patent Application No. 2018-005227 filed on Jan. 16, 2018, the entire contents of which are incorporated by reference.

TECHNICAL FIELD

The present invention relates to a filtration device.

BACKGROUND ART

Patent Document 1 discloses a filter structure in which lid-side protruding portions protruding toward an end surface of a filter element are formed on a lower surface of a lid member, and a filter-side recessed portion having a shape fitting to the lid-side protruding portions is formed in the filter element.

CITATION LIST

Patent Document

Patent Document 1: Japanese Registered Utility Model No. 3185612

In Patent Document 1, by cutting the lid-side protruding portions and the filter-side recessed portion of a component in which the lid-side protruding portions and the filter-side recessed portion are formed (so-called a genuine product), a component in which the lid-side protruding portions or the filter-side recessed portion are not formed (so-called a non-genuine product) becomes usable. Use of the non-genuine product possibly results in deterioration of filtration performance and a leakage of liquid.

SUMMARY OF INVENTION

One or more embodiments of the present invention provide a filtration device that securely prevents use of a component other than a genuine product (a component of a so-called non-genuine product).

A filtration device according to the present invention, for example, includes a filter element, a filter case, and a lid member. The filter element includes a filter medium, a first plate, and a second plate. The filter medium has a hollow substantially cylindrical shape with openings at both ends. The first plate is provided so as to cover the opening at an upper end of the filter medium. The second plate is provided so as to cover the opening at a lower end of the filter medium. The filter case having a bottomed substantially cylindrical shape is internally provided with the filter element. The lid member is provided so as to cover an opening at an upper end of the filter case. The filter element includes an inner tube inserted into a hollow portion of the filter medium. The second plate has a hole into which the inner tube is inserted. The inner tube includes a flange portion and a protruding portion. The flange portion having a substantially circular plate shape is disposed on a lower side of the second plate. The protruding portion is formed on the flange portion so as to protrude upward from the flange portion. A recessed portion into which the protruding portion is inserted is formed on a surface on a lower side of the second plate.

According to the filtration device according to one or more embodiments of the present invention, the protruding portion is formed on the inner tube inserted into the hollow portion of the filter medium so as to protrude upward from the flange portion. The flange portion having the substantially circular plate shape is disposed on the lower side of the second plate. The recessed portion into which the protruding portion is inserted is formed on the surface on the lower side of the second plate provided so as to cover the opening at the lower end of the filter medium. In contrast to a genuine product including the protruding portion and the recessed portion, in a non-genuine product not including the protruding portion or the recessed portion, the filter element cannot be inserted up to a correct position and therefore the filtration device cannot be used. By thus providing the protruding portion and the recessed portion in the genuine product, use of a component other than the genuine product (so-called a component of the non-genuine product) is securely prevented.

Here, the filtration device may be configured as follows. The first plate includes a first tubular portion having a substantially cylindrical shape. The first tubular portion protrudes toward the lid member with the filter element inserted into the filter case. The lid member includes a second tubular portion and ribs. The second tubular portion is inserted into a hollow portion of the first tubular portion. When the second tubular portion is inserted into the first tubular portion, the ribs are provided along an outer circumferential surface of the first tubular portion. A position of the first tubular portion overlaps with a position of the rib in plan view. A second recessed portion is formed on the rib such that a part where the rib overlaps with the first tubular portion is cut out. With the lid member attached to the first plate, a bottom surface of the second recessed portion is adjacent to a distal end of the first tubular portion. In contrast to the genuine product including the second recessed portion, in a non-genuine product not including the second recessed portion, the distal ends of the ribs abut on a distal end of the first tubular portion and therefore the filter element cannot be inserted up to the correct position and the filtration device cannot be used. This securely prevents the use of the component of the non-genuine product.

Here, the filtration device may be configured as follows. The first tubular portion includes a small-diameter portion provided on a distal end side and a large-diameter portion provided on a base side. The small-diameter portion has an outer diameter smaller than an outer diameter of the large-diameter portion. The second recessed portion is formed on the rib such that a position of the rib overlaps with a position of the small-diameter portion and a part where the rib overlaps with the small-diameter portion is cut out in plan view. With the lid member attached to the first plate, the ribs are disposed along an outer circumferential surface of the small-diameter portion and distal ends of the ribs are adjacent to a planar portion formed between the small-diameter portion and the large-diameter portion. In contrast to the genuine product including the second recessed portion, in a non-genuine product not including the second recessed portion, the distal ends of the ribs abut on a distal end of the small-diameter portion and therefore the filter element cannot be inserted up to the correct position and the filtration device cannot be used. This securely prevents the use of the component of the non-genuine product.

Here, the filtration device may be configured as follows. The first tubular portion includes projections protruding outward in a radial direction. The ribs are provided with notches. With the lid member attached to the first plate, the second tubular portion is inserted into the first tubular portion and the projections are inserted into the notches. This makes it difficult to produce the component of the non-genuine product, and use of the component of the non-genuine product can be more effectively prevented.

Here, the protruding portion may have a substantially cylindrical shape. Thus configuring the protruding portion so as to have a simple shape facilitates the manufacturing.

One or more embodiments of the present invention is capable of preventing the use of a component other than the genuine product (a component of a so-called non-genuine product).

DESCRIPTION OF EMBODIMENTS

Hereinafter, with reference to the drawings, detailed description will be made on embodiments of the present invention.

First Embodiment

Figure 1:
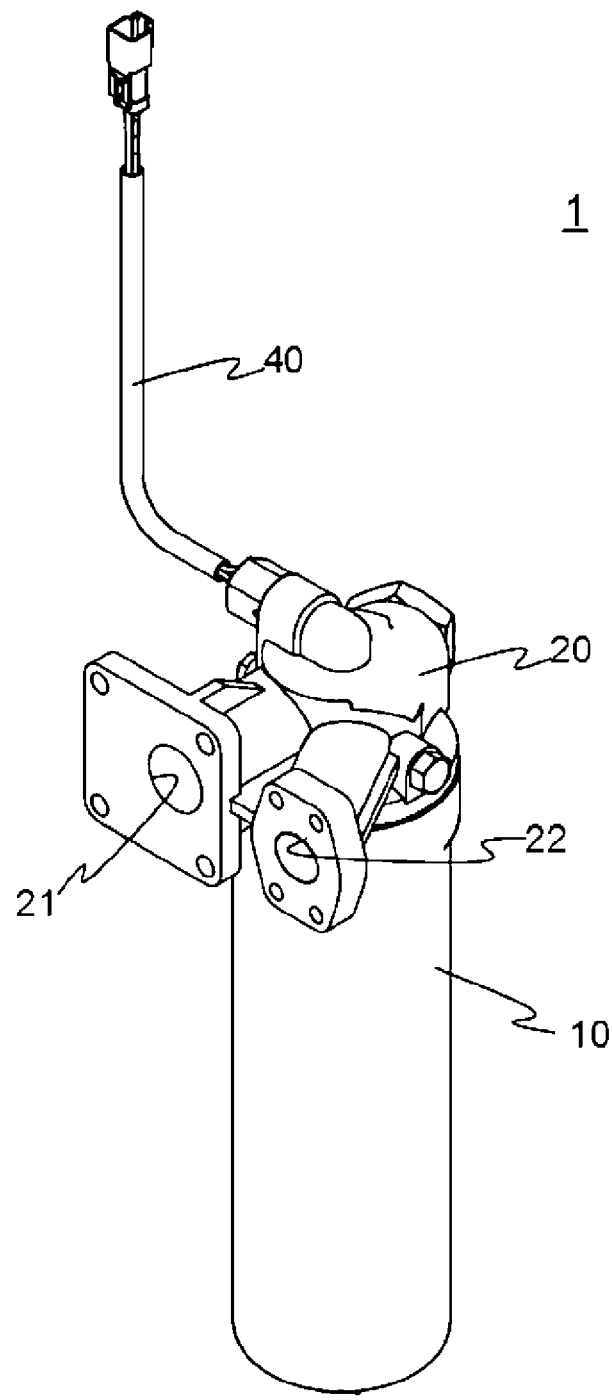
FIG. 1 is a perspective view illustrating an overview of a filtration device 1 according to a first embodiment of the present invention.

FIG. 1 is a perspective view illustrating an overview of a filtration device 1. The filtration device 1 removes, for example, dust contained in a liquid, such as an oil and water, using a filter and mainly includes a filter case 10, a lid member 20, and a filter element 30 (see, for example, FIG. 2).

The lid member 20 includes an inflow port 21 and an outflow port 22. The inflow port 21 flows a liquid before filtration in an internal space formed by the filter case 10 and the lid member 20. The outflow port 22 flows out a liquid after filtration.

An indicator 40 is provided on the lid member 20. The indicator 40 measures a pressure difference inside the filter case 10 using a reed switch (not illustrated) provided inside the indicator 40 and indicates the measurement result by turning on/off a lamp (not illustrated). Note that the indication of the measurement result is not limited to the turning on/off of the lamp. For example, the measurement result may be displayed on a display unit (for example, a liquid crystal panel).

Figure 2:
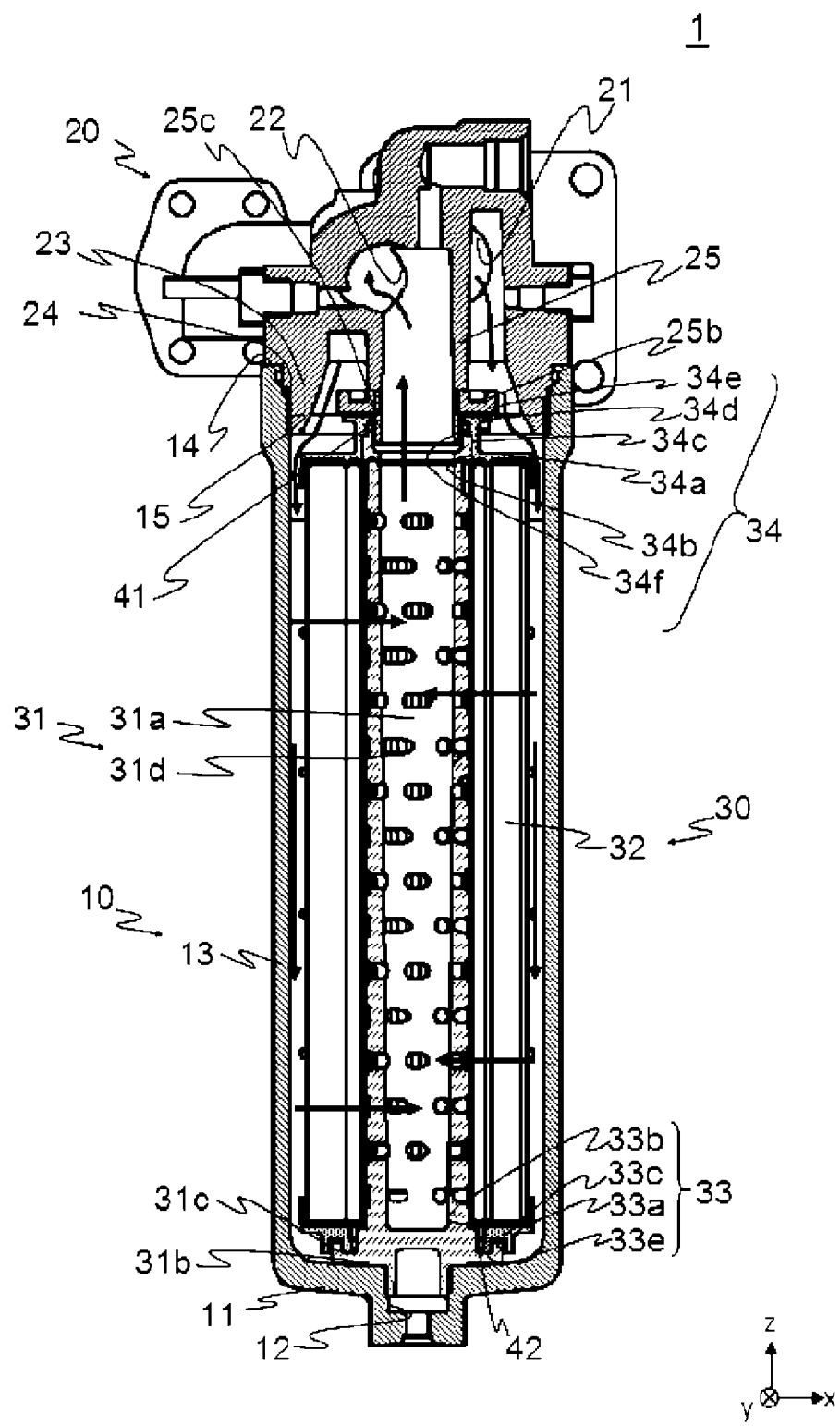
FIG. 2 is a cross-sectional view illustrating an overview of the filtration device 1.

FIG. 2 is a cross-sectional view illustrating an overview of the filtration device 1. The filter case 10 is a substantially bottomed cylindrical member made of metal or resin and has one end (here, a lower end) that is substantially closed and the open other end. The substantially closed lower end of the filter case 10 is a bottom surface 11.

A hole 12 is formed in the bottom surface 11 of the filter case 10, and a drain (not illustrated) is provided in the hole 12. The drain may be omitted.

The filter case 10 has a substantially cylindrical side surface 13. The side surface 13 has a lower end connected to the bottom surface 11. An upper end of the side surface 13 is an open end 14. An internal thread portion 15 is formed on an inner circumferential surface of the side surface 13 in the vicinity of the open end 14.

The lid member 20 is a member having a substantially bottomed cylindrical shape and made of metal. The lid member 20 includes an attachment portion 23 having a substantially cylindrical shape formed to protrude from the bottom surface to a lower side (−z side). An external thread portion 24 is formed on an outer circumferential surface of the attachment portion 23.

The open end 14 of the filter case 10 is attached to the lid member 20. Screwing the external thread portion 24 into the internal thread portion 15 attaches the lid member 20 to the filter case 10. The lid member 20 is thus provided so as to cover the open end 14 of the filter case 10. Note that the lid member 20 is provided such that its bottom surface is located on the upper side (+z side).

Thus connecting the open end of the lid member 20 and an open end of the filter case 10 forms a space into which the filter element 30 is inserted is formed inside the filtration device 1.

A sealing member (for example, an O-ring) (not illustrated) is provided between the filter case 10 and the lid member 20. The sealing member provides sealing to avoid a liquid to leak outside from between the filter case 10 and the lid member 20.

The lid member 20 includes a fitting cylinder 25 having a substantially cylindrical shape formed to protrude from the bottom surface to the lower side (−z side). The fitting cylinder 25 is formed inside the attachment portion 23. The fitting cylinder 25 is inserted into an inside of a tubular portion 34c (described in detail later) of a plate 34 (described in detail later). The fitting cylinder 25 constitutes a structure for preventing imitation attachment (a first imitation attachment prevention structure, described in detail later).

The filter case 10 is internally includes the filter element 30 and an inner tube 31. The filter element 30 mainly includes a filter medium 32 and plates 33, 34 provided on both ends of the filter medium 32.

When the lid member 20 is attached to the filter case 10, the filter element 30 and the inner tube 31 are held in the internal space formed by the filter case 10 and the lid member 20.

The inner tube 31 is a member having a hollow substantially cylindrical shape and formed of a material with high corrosion resistance (resin in the present embodiment). The inner tube 31 is provided inside the filter case 10 and inserted an inner circumferential surface of the filter medium 32. The substantially cylindrical part inserted into the inner circumferential surface of the filter medium 32 is a tubular portion 31a. A large number of holes 31d through which hydraulic oil passes are formed on the entire surface of the tubular portion 31a.

The filter medium 32 has a hollow substantially cylindrical shape having a thickness in the radial direction thereof. The filter medium 32 is formed by pleating a sheet-like filter paper using, for example, synthetic resin and paper, and connecting both ends of the pleated filter paper to round in a cylindrical shape. The filter medium 32 is provided on the outer side of the inner tube 31.

The plates 33, 34 are substantially plate-shaped members, and are formed using a material with high corrosion resistance (resin in the present embodiment). The plate 33 is provided on the lower side of the filter medium 32, and the plate 34 is provided on the upper side of filter medium 32.

The plates 33, 34 include plate-like portions 33a, 34a having a substantially circular plate shape that cover end surfaces of the filter medium 32. Holes 33b, 34b into which the inner tube 31 is inserted are formed in the plate-like portions 33a, 34a, respectively. In plan view (as viewed in the z-direction), the holes 33b, 34b have a size substantially same as a size of a hollow portion of the filter medium 32.

The inner tube 31 includes a flange portion 31b having a substantially circular plate shape disposed on a lower side of the plate-like portion 33a and a protruding portion 31c formed so as to protrude upward from the flange portion 31b. A recessed portion 33c into which the protruding portion 31c is inserted is formed on a surface on a lower side of the plate-like portion 33a. The protruding portion 31c and the recessed portion 33c constitute a structure for preventing imitation attachment (a second imitation attachment prevention structure, described in detail later).

The tubular portion 34c having a substantially cylindrical shape is formed on the plate-like portion 34a. The tubular portion 34c protrudes on the opposite side of the filter medium 32 when the plate 34 is provided on the filter medium 32. In other words, the tubular portion 34c protrudes toward the lid member 20 with the filter element 30 inserted into the filter case 10.

Projections 34d are formed in the vicinity of a distal end 34e of the tubular portion 34c. The projections 34d constitute a structure for preventing imitation attachment (the first imitation attachment prevention structure, described in detail later).

The fitting cylinder 25 is inserted into the tubular portion 34c. In the vicinity of the distal end 34e of the tubular portion 34c, an inner circumferential surface 34f opposed to the fitting cylinder 25 when the fitting cylinder 25 is inserted is provided. When the fitting cylinder 25 is inserted into the tubular portion 34c, a sealing member 41 provided on the inner circumferential surface 34f elastically deforms and closely contacts the fitting cylinder 25 and the tubular portion 34c. As a result, the filter element 30 is provided on the lid member 20.

Figure 3:
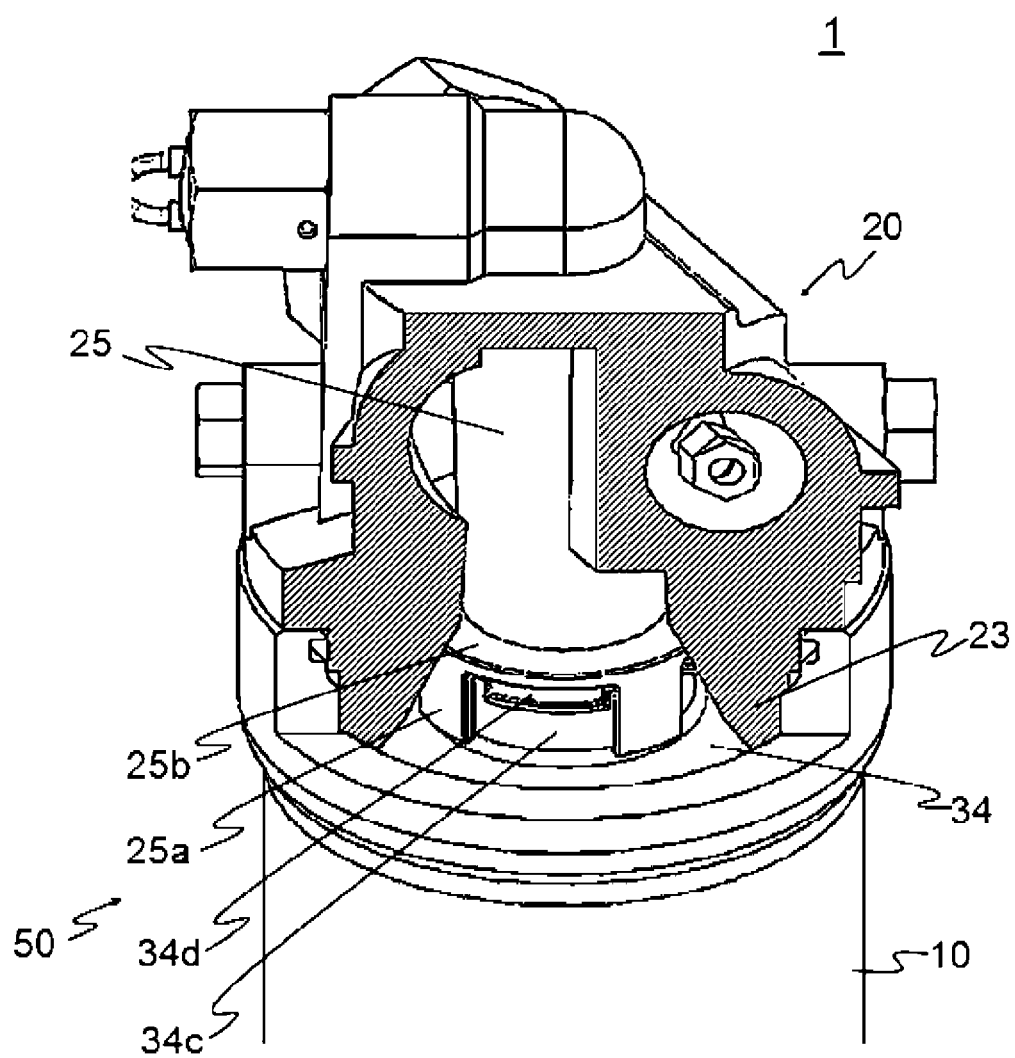
FIG. 3 is a partially enlarged view of the filtration device 1 and a partially cutaway view.

FIG. 3 is a partially enlarged view of the filtration device 1 and a partially cutaway view. A first imitation attachment prevention structure 50 mainly includes ribs 25a formed on the fitting cylinder 25 and the projections 34d formed on the tubular portion 34c.

Figure 4:
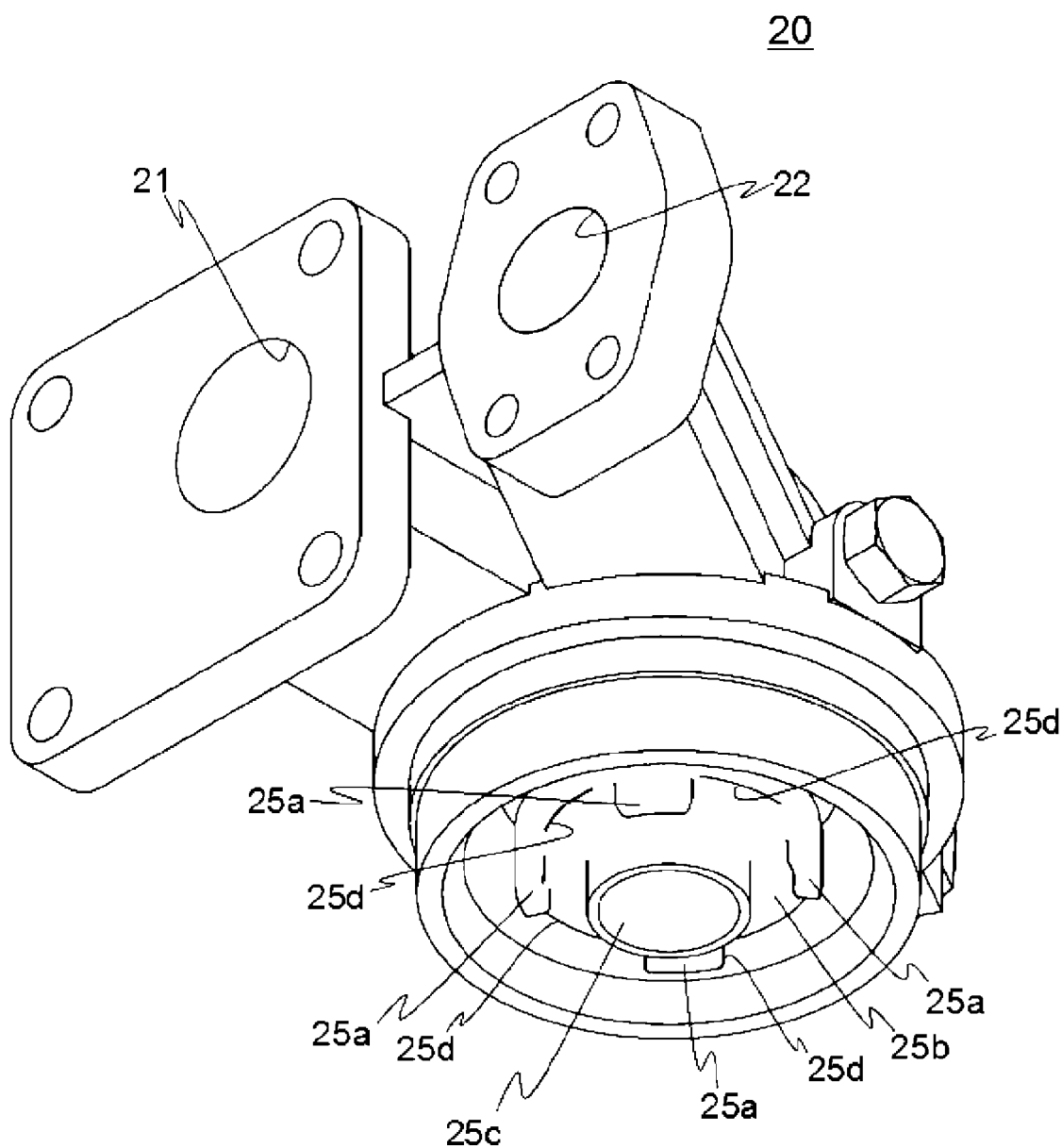
FIG. 4 is a perspective view of a lid member 20.

FIG. 4 is a perspective view of the lid member 20. A flange portion 25b having a substantially circular plate shape is provided in the vicinity of a lower end of the fitting cylinder 25 (see FIG. 3) so as to protrude outward in the radial direction. A distal end side with respect to the flange portion 25b of the fitting cylinder 25 is an insertion portion 25c inserted into a hollow portion of the tubular portion 34c (see FIG. 3).

A plurality of the ribs 25a substantially parallel to the insertion portion 25c are formed on the flange portion 25b. The rib 25a is a substantially plate-shaped member and protrudes in the same direction as the insertion portion 25c. Each of the plurality of ribs 25a are a part of a substantially-cylindrical-shaped rib and are separately provided. Between the adjacent ribs 25a and 25a are notches 25d into which the projections 34d are inserted. In plan view, the plurality of ribs 25a and notches 25d are disposed uniformly.

Figure 5:
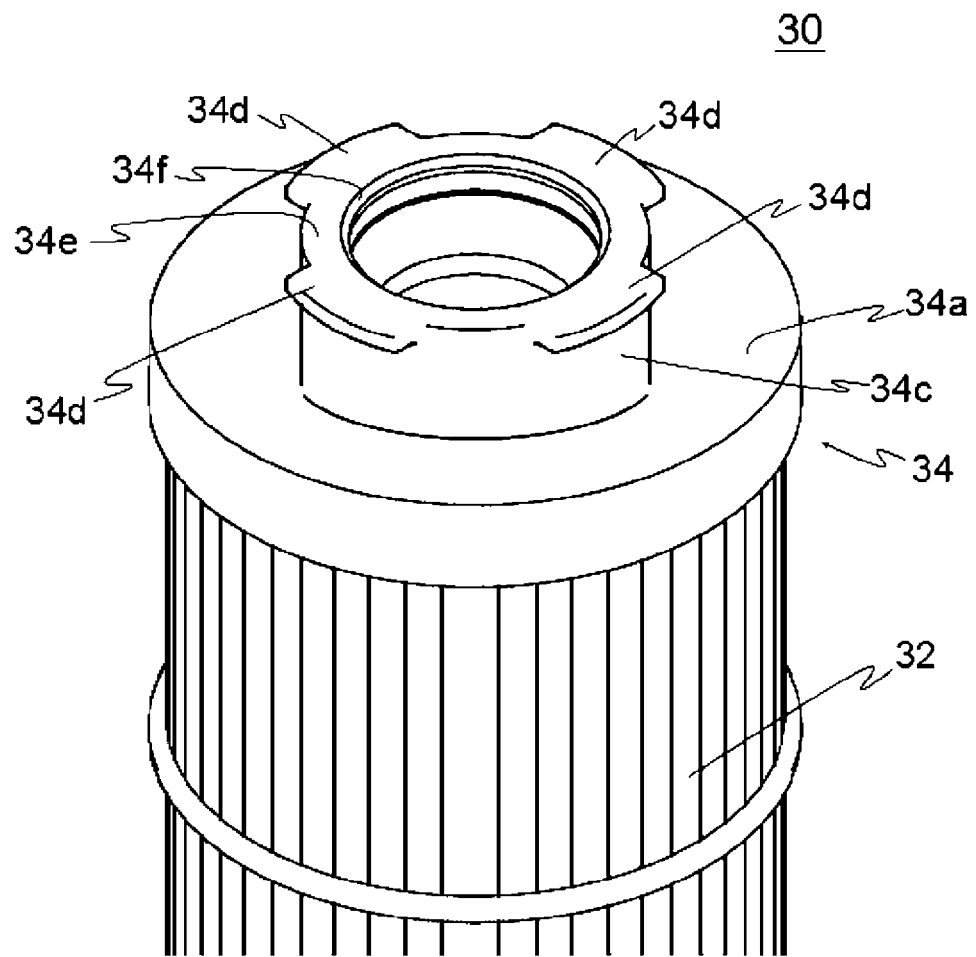
FIG. 5 is a perspective view of a filter element 30.

FIG. 5 is a perspective view of the filter element 30. A plurality of the projections 34d having a substantially plate shape protruding outward in the radial direction are formed on the tubular portion 34c. Each of the plurality of projections 34d are a part of a flange having a substantially circular plate shape and are separately provided. In plan view, the plurality of projections 34d are disposed uniformly.

In the present embodiment, while the projections 34d are provided along the distal end 34e, the projections 34d only need to be provided in the vicinity of the distal end 34e. For example, the projections 34d may be provided slightly below the distal end 34e. However, it is desirable that a position in a height direction of the projection 34d overlaps with the inner circumferential surface 34f.

The description will now return to FIG. 3. When the insertion portion 25c (see FIG. 4) is inserted into the tubular portion 34c and the lid member 20 is attached to the plate 34, the ribs 25a are provided along the outer circumferential surface of the tubular portion 34c. In addition, when the insertion portion 25c (see FIG. 4) is inserted into the tubular portion 34c and the lid member 20 is attached to the plate 34, the projection 34d is inserted between the rib 25a and the rib 25a.

By disposing the ribs 25a and the projections 34d in this manner, the projections 34d do not interfere with the ribs 25a, and the lid member 20 can be pushed to the plate 34 until the distal end 34e (see FIG. 5) of the tubular portion 34c abuts on the flange portion 25b.

Figure 6:
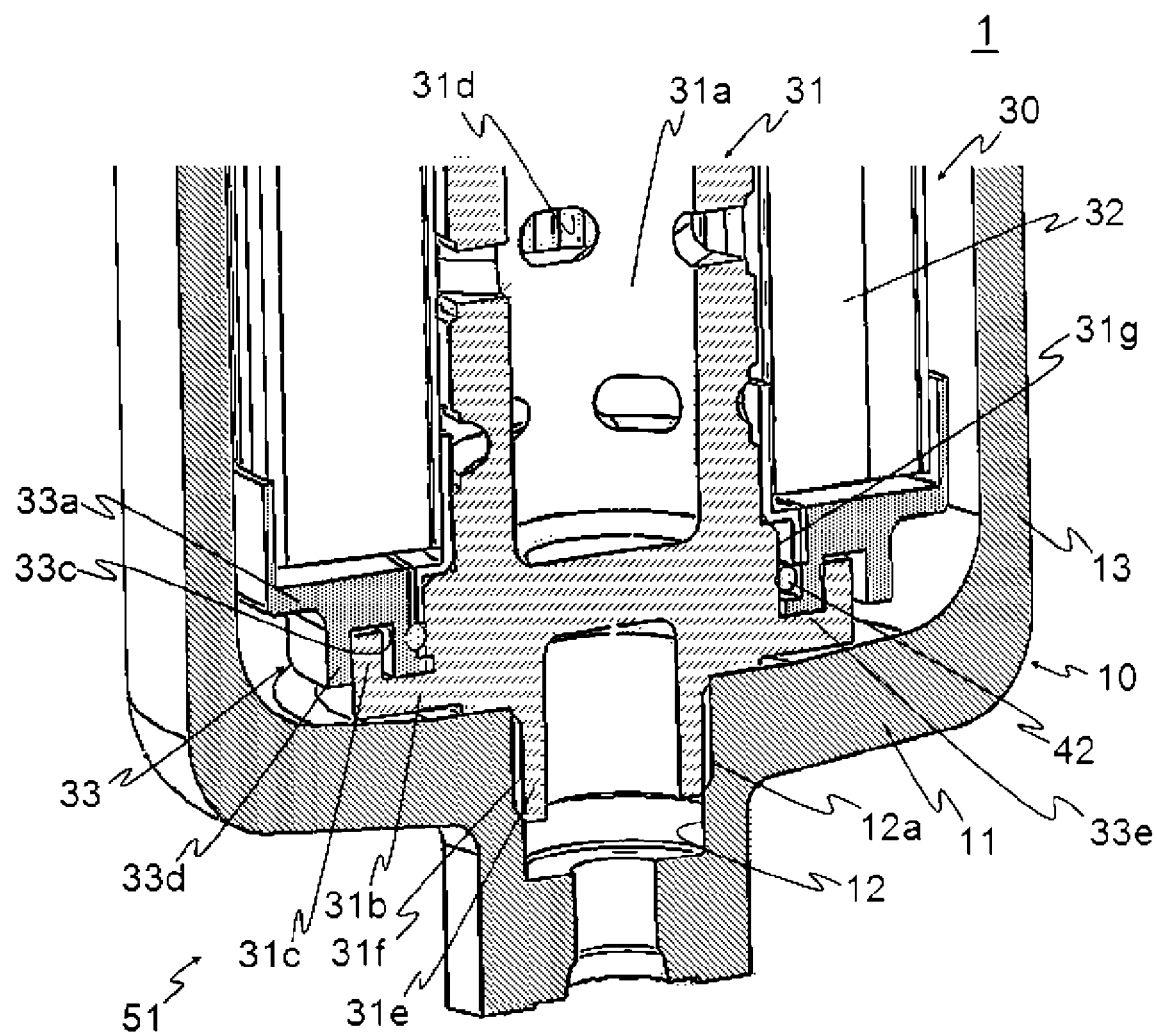
FIG. 6 is a cross-sectional perspective view of the filtration device 1 and a partially enlarged view.

FIG. 6 is a cross-sectional perspective view of the filtration device 1 and a partially enlarged view. A second imitation attachment prevention structure 51 mainly includes the protruding portion 31c formed on the inner tube 31 and the recessed portion 33c formed on the plate 33.

Figure 7:
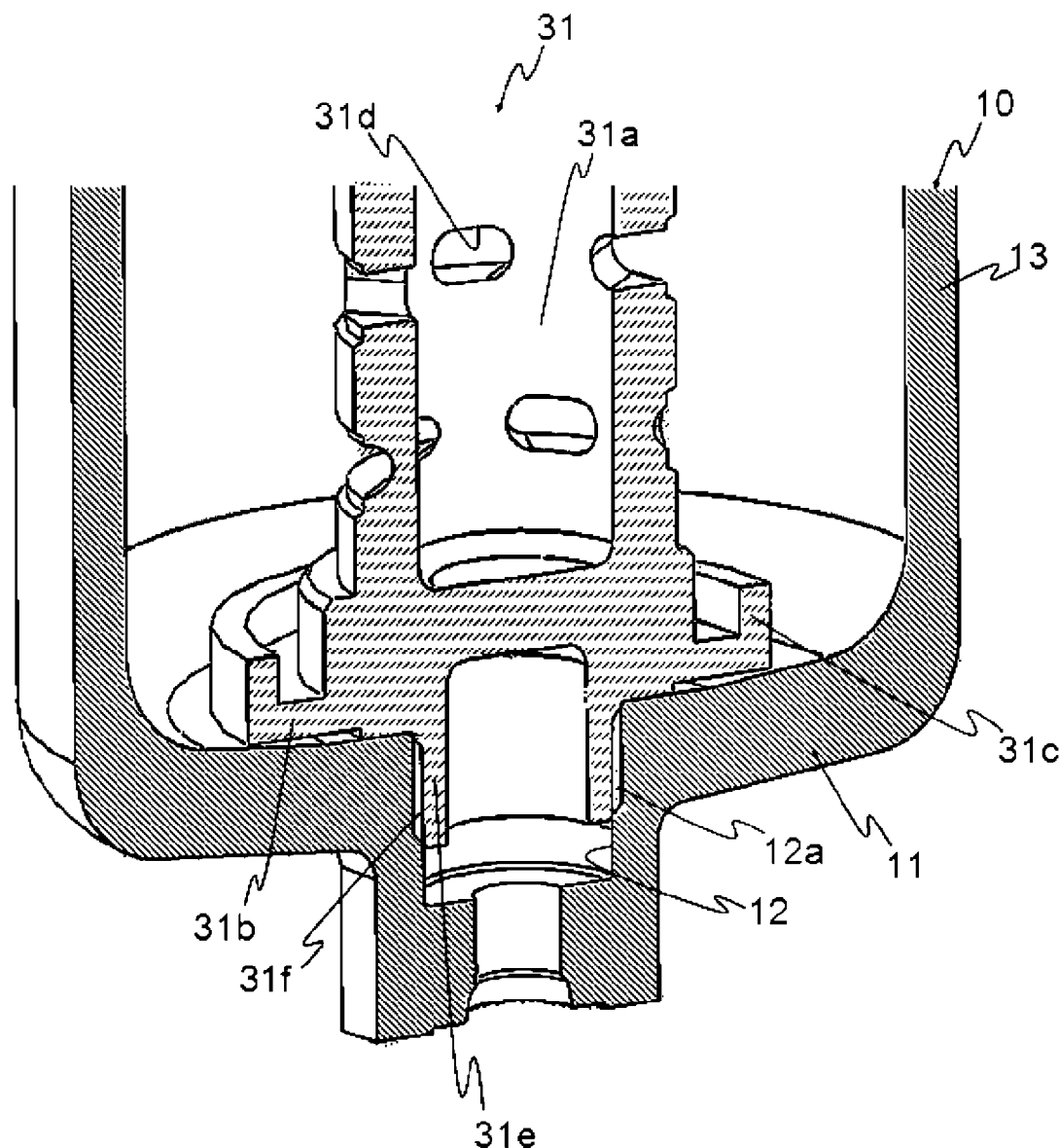
FIG. 7 is a cross-sectional perspective view of a filter case 10 and an inner tube 31 and a partially enlarged view.

FIG. 7 is a cross-sectional perspective view of the filter case 10 and the inner tube 31 and a partially enlarged view. The inner tube 31 includes a protruding portion 31e formed so as to protrude downward (in the −z-direction) from the flange portion 31b having a substantially circular plate shape. When an external thread 31f formed on an outer circumferential surface of the protruding portion 31e is screwed into an internal thread portion 12a formed in the hole 12, the inner tube 31 is attached to the filter case 10. With the inner tube 31 attached to the filter case 10, the flange portion 31b abuts on the bottom surface 11.

The protruding portion 31c that protrudes upward (in the +z-direction) from the flange portion 31b is formed on the flange portion 31b. Here, the protruding portion 31c has a simple shape and is a rib having a substantially cylindrical shape for ease of manufacturing.

Figure 8:
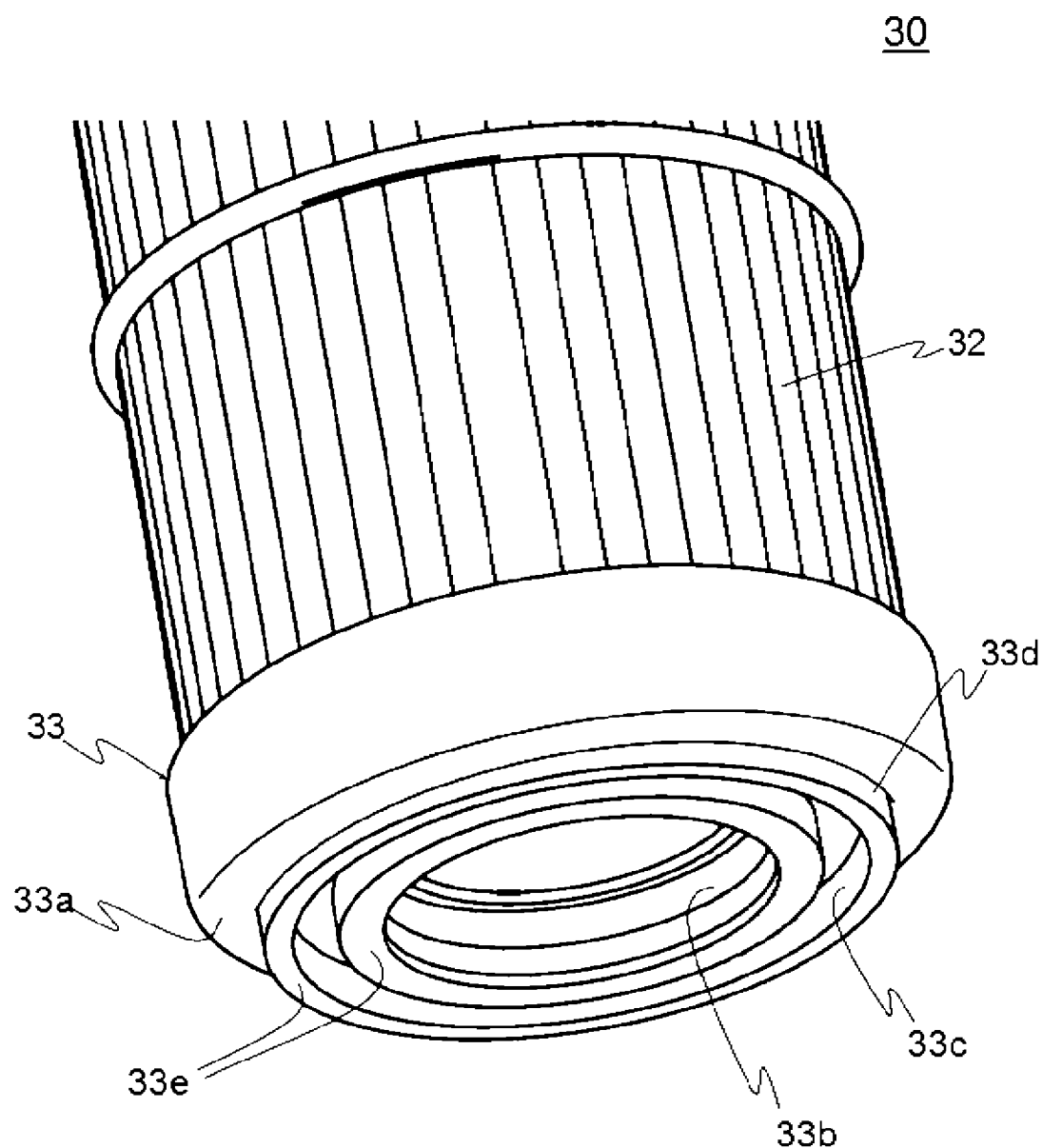
FIG. 8 is a perspective view of the filter element 30 and a partially enlarged view.

FIG. 8 is a perspective view of the filter element 30 and a partially enlarged view. The plate 33 includes a tubular portion 33d formed on a lower side of the plate-like portion 33a. The recessed portion 33c is formed in a surface 33e of the lower side of the tubular portion 33d. Here, the recessed portion 33c is a substantially circular groove.

The description will now return to FIG. 6. The filter element 30 is inserted into the filter case 10 so that the inner tube 31 is inserted into the hollow portion of the filter medium 32. Because the protruding portion 31c is inserted into the recessed portion 33c, the filter element 30 is inserted until the surface 33e abuts on an upper surface of the flange portion 31b.

When the surface 33e is inserted until abutting on the upper surface of the flange portion 31b, a sealing member 42 provided in the hole 33b elastically deforms and closely contacts an outer circumferential surface 31g of the inner tube 31 and an inner circumferential surface of the tubular portion 33d. As a result, the filter element 30 is provided to the inner tube 31.

Next, an operation of the filtration device 1 will be described. The arrows in FIG. 2 indicate a flow of a liquid. The liquid that has flowed from the inflow port 21 is introduced between the filter case 10 and the filter element 30. After that, the liquid passes through the filter medium 32 from outside to inside, and impurities in the liquid are removed in the process. The liquid that has passed through the inside of the filter medium 32 passes through the holes 31d formed in the inner tube 31 and flows out to the inside of the inner tube 31.

The liquid after filtration flows out to the outside of the filtration device 1 from the inside of the inner tube 31 via the outflow port 22. Note that between the filter element 30 and the inner tube 31, and between the filter element 30 and the lid member 20 are liquid-tightly closed by the sealing members 41, 42, respectively. Therefore, the liquid before filtration does not penetrate into the inside of the inner tube 31.

The filtration of the liquid gradually decreases a filtration capacity of the filter medium 32. Thus, the filter element 30 is replaced periodically or as needed. A procedure of the replacement will be described below.

First, the external thread portion 24 and the internal thread portion 15 are unscrewed to disassemble the filter case 10 and the lid member 20. As a result, the plate 34 of the filter element 30 is exposed. By pulling up the plate 34, the filter element 30 is removed from the inner tube 31. At this time, the use of the projections 34d as gripped portions facilitates handling of the filter element 30.

After that, the new filter element 30 is then inserted into the filter case 10. Because the protruding portion 31c is formed in the inner tube 31, the insertion of the filter element 30 in which the recessed portion 33c is formed inserts the protruding portion 31c into the recessed portion 33c, and the filter element 30 is pushed until the surface 33e abuts on the upper surface of the flange portion 31b.

When the filter element 30 is inserted into the filter case 10, the external thread portion 24 and the internal thread portion 15 are screwed to join the filter case 10 and the lid member 20 together. In the process of screwing the external thread portion 24 and the internal thread portion 15, the fitting cylinder 25 is inserted into the tubular portion 34c, and the projection 34d is inserted between the rib 25a and the rib 25a. When the external thread portion 24 and the internal thread portion 15 continue to be screwed together, by pressing the projections 34d by the ribs 25a, the fitting cylinder 25 is inserted into the inside of the tubular portion 34c while the lid member 20 and the filter element 30 rotate with respect to the inner tube 31.

Because the projection 34d is inserted into the notch 25d between the rib 25a and the rib 25a, the external thread portion 24 and the internal thread portion 15 can be screwed together until the distal end 34e of the tubular portion 34c abuts on the flange portion 25b. Thus, the replacement of the filter element 30 ends.

Here, assume a case in which a filter element as a non-genuine product other than the filter element 30, which is a genuine product, is attached to the filter case 10 and the lid member 20. For example, in a case where the recessed portion 33c is not formed on the filter element of the non-genuine product, the surface 33e abuts on the protruding portion 31c and the filter element of the non-genuine product cannot be inserted up to the correct position. As a result, the external thread portion 24 and the internal thread portion 15 cannot be screwed together, and the filtration device 1 cannot be used.

For example, in a case where a depth of the recessed portion 33c formed on the filter element of the non-genuine product is insufficient or in a case where the projections 34d are not formed on the filter element of the non-genuine product, the external thread portion 24 and the internal thread portion 15 can be screwed only up to the middle, and the filtration device 1 cannot be used.

For example, assume a case in which, instead of the projections 34d of the filter element 30 as the genuine product, a flange having a substantially circular plate shape is provided on the filter element as the non-genuine product. In a case where such a filter element of the non-genuine product is inserted into the filter case 10, the rib 25a contacts the flange during the process of screwing the external thread portion 24 and the internal thread portion 15, and the external thread portion 24 and the internal thread portion 15 cannot be screwed together, thereby failing to assemble the filtration device 1. In addition, also in the case where the notches 25d are not formed on a lid member not a genuine product (a rib having a substantially cylindrical shape is formed), the rib having the substantially cylindrical shape contacts the projection 34d and the external thread portion 24 and the internal thread portion 15 cannot be screwed together, thereby failing to assemble the filtration device 1.

According to the present embodiment, it is possible to reliably prevent the use of the filter element other than the filter element 30 as the genuine product, that is, the filter element of the non-genuine product.

Note that while the filtration device 1 includes the first imitation attachment prevention structure 50 and the second imitation attachment prevention structure 51 in the present embodiment, the filtration device 1 only needs to include the first imitation attachment prevention structure 50 or the second imitation attachment prevention structure 51.

In addition, while the filtration device 1 includes the four ribs 25a and the four projections 34d in the present embodiment, at least one projection 34d only needs to be provided. In the case of one projection 34d, it is only necessary that the two ribs 25a are provided at positions where the projection 34d is sandwiched and the projection 34d is inserted into the notch 25d between the two ribs 25a. Additionally, in the case of one projection 34d, instead of the two ribs 25a, one rib having a substantially cylindrical shape with the notch 25d to which the projection 34d fits may be provided. However, to make manufacturing of the non-genuine product difficult and to reliably prevent the use of the component other than the genuine product, providing the plurality of ribs 25a, notches 25d, and projections 34d is preferred. Additionally, the plurality of ribs 25a, notches 25d, and projections 34d are preferably provided uniformly. For example, the six ribs 25a, the six notches 25d, and the six projections 34d may be provided at every approximately 60 degrees. In this manner, by providing the plurality of ribs 25a, notches 25d, and projections 34d and disposing these members uniformly, assembly properties can be improved while the use of the component other than the genuine product is prevented.

Second Embodiment

In the present embodiment, while the first imitation attachment prevention structure 50 includes the ribs 25a and the projections 34d, and the ribs 25a are provided along the outer circumferential surface of the tubular portion 34c, the configurations of the ribs 25a, the tubular portion 34c, and the projections 34d are not limited to these configurations.

Figure 9:
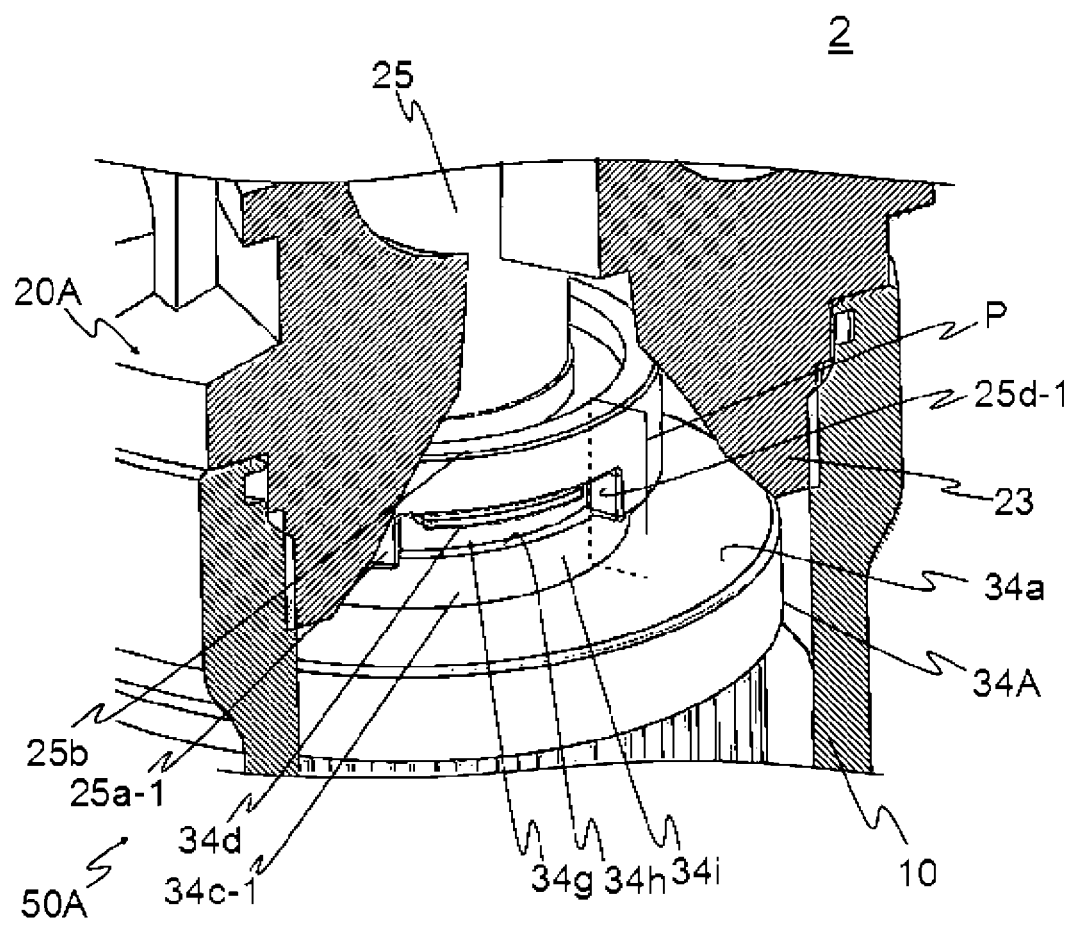
FIG. 9 is a diagram illustrating an overview of a first imitation attachment prevention structure 50A included in a filtration device 2.

FIG. 9 is a diagram illustrating an overview of a first imitation attachment prevention structure 50A included in a filtration device 2. The first imitation attachment prevention structure 50A includes ribs 25a-1, a tubular portion 34c-1, and the projections 34d. A notch 25d-1 into which the projection 34d is inserted is provided between the ribs 25a-1 and the ribs 25a-1. The projections 34d are provided on a distal end of a small-diameter portion 34g. The small-diameter portion 34g is provided on a distal end side of the tubular portion 34c-1, and has an outer diameter smaller than that of a large-diameter portion 34i provided on a base side of the tubular portion 34c-1.

The tubular portion 34c-1 has a planar portion 34h, and the planar portion 34h is formed between the small-diameter portion 34g and the large-diameter portion 34i. When a lid member 20A is attached to a plate 34A, the projections 34d are inserted into the notches 25d-1, the ribs 25a-1 are provided along the outer circumferential surface of the small-diameter portion 34g, and distal ends of the ribs 25a-1 are adjacent to the planar portion 34h.

Figure 10:
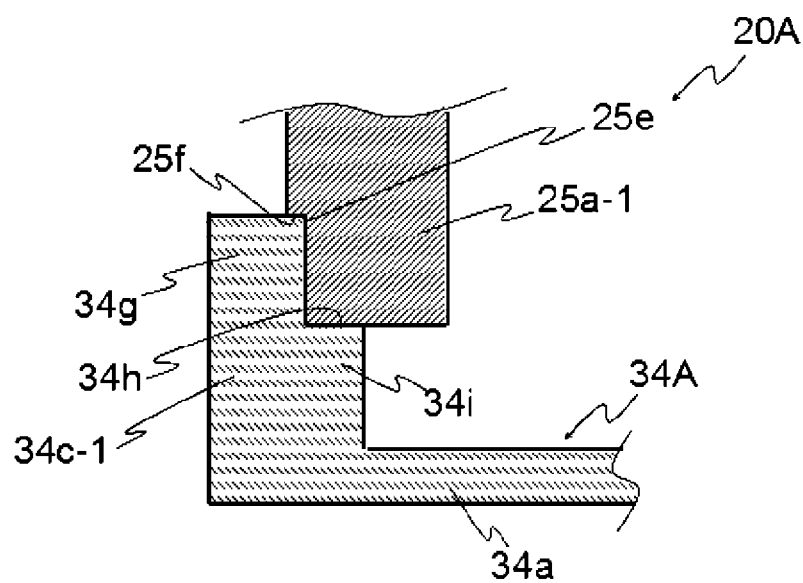
FIG. 10 is a cross-sectional view on a surface P in FIG. 9.

FIG. 10 is a cross-sectional view on a surface P in FIG. 9. FIG. 10 illustrates a state seen from a front side of the paper of FIG. 9. In plan view, the position of the rib 25a-1 overlaps with the position of the tubular portion 34c-1. Additionally, a recessed portion 25e is formed on the rib 25a-1 such that the position of the rib 25a-1 overlaps with the position of the small-diameter portion 34g and a part where the rib 25a-1 overlaps with the small-diameter portion 34g is cut out in plan view. Thus, when the lid member 20A is attached to the plate 34A, a bottom surface 25f of the recessed portion 25e is adjacent to the distal end of the small-diameter portion 34g, and the lid member 20A is pushed to the plate 34A up to a position where the distal end of the rib 25a-1 is adjacent to the planar portion 34h.

Here, assume a case where a non-genuine product in which the recessed portions 25e are not provided on the ribs 25a-1 is attached to the filter case 10 (see FIG. 9). When the recessed portion 25e is not provided, the distal end of the rib 25a-1 abuts on the distal end of the small-diameter portion 34g and the lid member 20A cannot be pushed up to the position where the distal end of the rib 25a-1 is adjacent to the planar portion 34h, and therefore the lid member 20A cannot be attached to the filter case 10. In contrast, in the filtration device 2, the ribs 25a-1 and the tubular portion 34c-1 are formed so that the positions of the ribs 25a-1 and the position of the tubular portion 34c-1 overlap in plan view, and the recessed portions 25e are provided such that the ribs 25a-1 do not contact the small-diameter portion 34g. Thus, the lid member 20A can be pushed up to the position where the distal end of the rib 25a-1 is adjacent to the planar portion 34h.

As described above, according to the present embodiment, the use of the filter element or the lid member of the non-genuine product can be reliably prevented. In addition, since the components are not increased, the assembly properties are not reduced.

Note that in the present embodiment, the second imitation attachment prevention structure 51 may be omitted. The filtration device 2 may only include the first imitation attachment prevention structure 50A or may include the first imitation attachment prevention structure 50A and the second imitation attachment prevention structure 51.

Modifications of Second Embodiment

Figure 11:
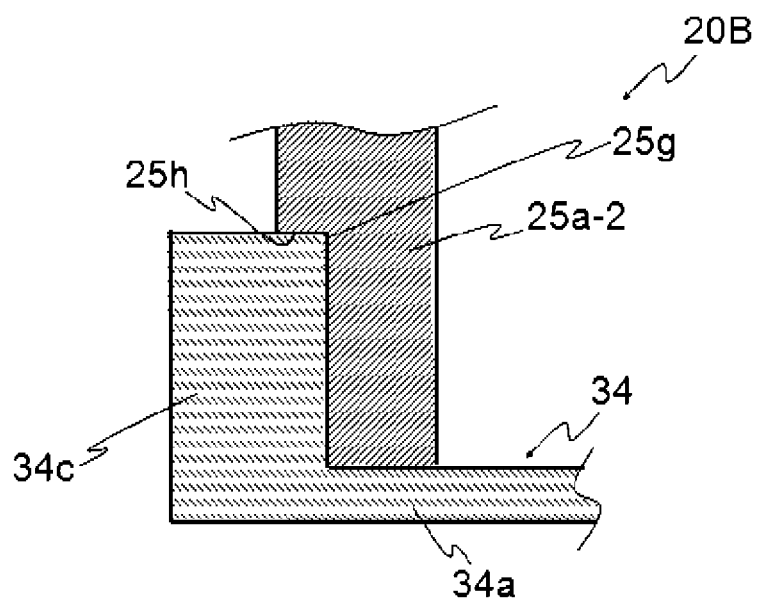
FIG. 11 is a diagram illustrating an overview of a modification in which a small-diameter portion 34g is not used.

While the second embodiment uses the tubular portion 34c-1 with the small-diameter portion 34g formed on its distal end, the small-diameter portion 34g may be omitted. FIG. 11 is a diagram illustrating an overview of the modification in which the small-diameter portion 34g is not used. A recessed portion 25g is formed on a rib 25a-2 such that a position of the rib 25a-2 overlaps with the position of the tubular portion 34c and a part where the rib 25a-2 overlaps with the tubular portion 34c is cut off in plan view. Thus, when a lid member 20B is attached to the plate 34, a bottom surface 25h of the recessed portion 25g is adjacent to the distal end of the tubular portion 34c, and the lid member 20B is pushed to the plate 34 up to a position where the distal end of the rib 25a-2 is adjacent to the plate-like portion 34a.

In contrast, assume a case where a non-genuine product in which the recessed portion 25g is not provided is attached to the filter case 10 (see FIG. 9). In a case where the recessed portion 25g is not provided, the distal end of the rib 25a-2 abuts on the distal end of the tubular portion 34c, and the lid member 20B cannot be pushed up to a position where the distal end of the rib 25a-2 is adjacent to the plate-like portion 34a. As described above, in the present modification, the use of the filter element or the lid member of the non-genuine product can be reliably prevented, similarly to the second embodiment.

Note that, in the second embodiment, the shape is more complicated than that of the present modification. Thus, when the lid member or the filter element of the non-genuine product is processed and attempted to be attached to the filter case of the genuine product, processing the non-genuine product is difficult. Therefore, compared to the present modification, the second embodiment can more reliably prevent the use of the filter element or the lid member of the non-genuine product.

Third Embodiment

Figure 12:
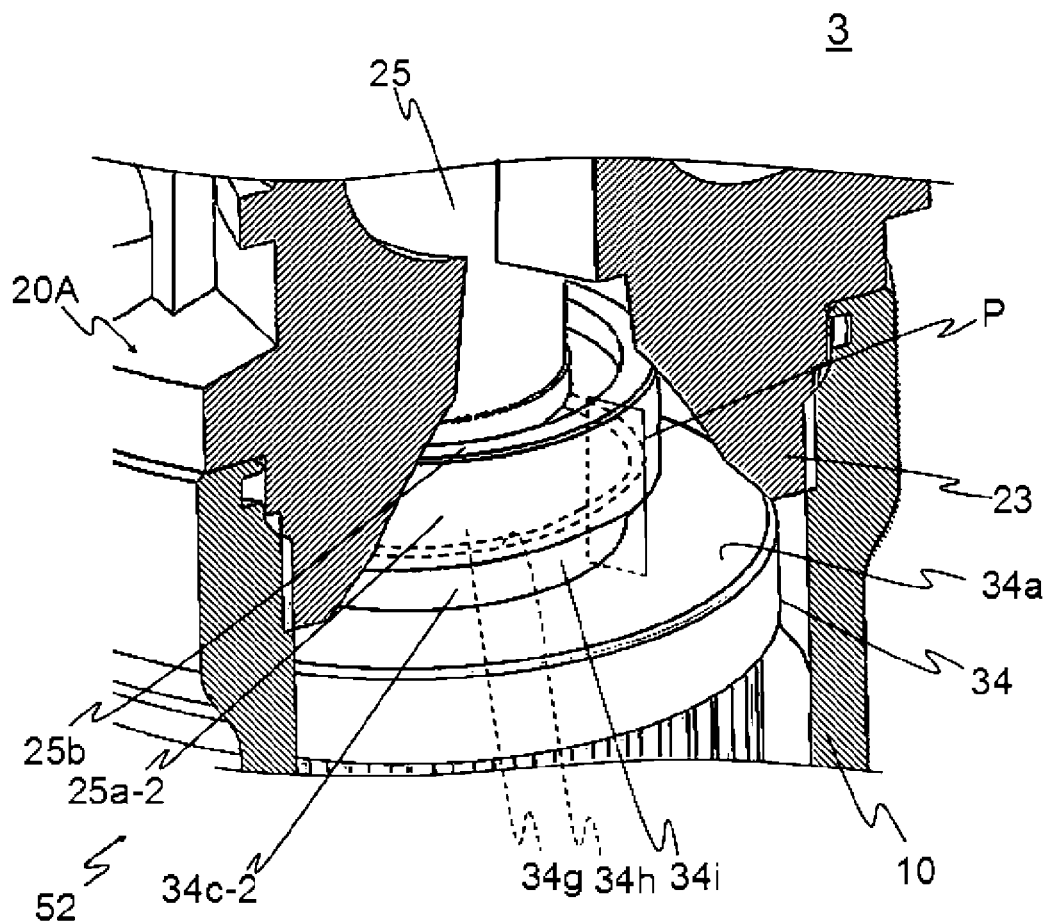
FIG. 12 is a diagram illustrating an overview of a third imitation attachment prevention structure 52 included in a filtration device 3.

The third embodiment has a configuration in which a third imitation attachment prevention structure 52 is provided instead of the first imitation attachment prevention structure 50. FIG. 12 is a diagram illustrating an overview of the third imitation attachment prevention structure 52 included in a filtration device 3.

A difference between the third imitation attachment prevention structure 52 and the first imitation attachment prevention structure 50A is presence/absence of the notches 25d-1. The third imitation attachment prevention structure 52 includes the rib 25a-2 and a tubular portion 34c-2. The rib 25a-2 is a substantially cylindrical rib substantially parallel to the insertion portion 25c (see FIG. 2) and similar to the rib 25a-1 except that notches are not formed. The tubular portion 34c-2 is the similar to the tubular portion 34c-1 except that the projections 34d are not formed. The cross-sectional shape of the surface P in FIG. 12 is similar to that of FIG. 10.

According to the present embodiment, the filtration device 3 including the third imitation attachment prevention structure 52 avoids the external thread portion 24 and the internal thread portion 15 (see FIG. 2) to be screwed together even when the filter element or the lid member of the non-genuine product is attempted to be attached to the filter case 10. As a result, the use of the filter element or the lid member of the non-genuine product can be reliably prevented.

Note that the filtration device 3 may include the second imitation attachment prevention structure 51 in addition to the third imitation attachment prevention structure 52. The filtration device 3 including the second imitation attachment prevention structure 51 and the third imitation attachment prevention structure 52 allows further reliably preventing the use of the filter element or the lid member of the non-genuine product. A cross-sectional shape of the surface Pin FIG. 12 may be similar to that of FIG. 11.

The embodiments of the invention are described above in detail with reference to the drawings. Specific configurations are not limited to the embodiments and also include changes in the design or the like within a scope that does not depart from the gist of the invention. A person skilled in the art can easily modify, add, and convert each element in the above embodiments as appropriate.

In addition, the term "substantially" in the present invention is a concept not only including the case of being strictly the same, but also including deviations and modifications to an extent that the deviations and modifications do not result in a loss of identity. For example, the term "substantially same" is not limited to the case of being strictly same, but is a concept that includes an error to the extent not losing sameness. Further, for example, when simply expressed as "same," it also includes a case of substantially same, in addition to the case of being strictly same. In addition, in the present invention, the term "near" means to include a region in a certain range (the range can be determined as desired) near a reference position. For example, "in the vicinity of A" refers to a region of a range near A, and is a concept indicating that A may or may not be included.

REFERENCE SIGNS LIST

1 Filtration device
10 Filter case
11 Bottom surface
12 Hole
12a Internal thread portion
13 Side surface
14 Opening end
15 Internal thread portion
20 Lid member
21 Inflow port
22 Outflow port
23 Attachment portion
24 External thread portion
25 Fitting cylinder
25a, 25a-1, 25a-2 Rib
25b Flange portion
25c: Insertion portion
25d, 25d-1 Notch
25e, 25g: Recessed portion
25f Bottom surface
30 Filter element
31 Inner tube
31a Tubular portion
31b Flange portion
31c Protruding portion
31d Hole
31e Protruding portion
31f External thread
31g Outer circumferential surface
32 Filter medium
33, 34 Plate
33a Plate-like portion
33b Hole
33c Recessed portion
33d Tubular portion
33e Surface
34a Plate-like portion
34b Hole
34c, 34c-1, 34c-2 Tubular portion
34d Projection
34e Distal end
34f Inner circumferential surface
34g Small-diameter portion
34h Planar portion
40 Indicator
41, 42: Sealing member
50, 50A First imitation attachment prevention structure
51 Second imitation attachment prevention structure
52 Third imitation attachment prevention structure

The invention claimed is:

1. A filtration device comprising:
a filter element that includes a filter medium, a first plate, and a second plate, the filter medium having a hollow substantially cylindrical shape with openings at both ends, the first plate covering the opening at an upper end of the filter medium, the second plate covering the opening at a lower end of the filter medium;
a filter case having a bottomed substantially cylindrical shape that is internally provided with the filter element; and
a lid member covering an opening at an upper end of the filter case, wherein;
the filter element includes an inner tube inserted into a hollow portion of the filter medium;
the second plate has a hole into which the inner tube is inserted;
the inner tube includes a flange portion and a protruding portion, the flange portion having a substantially circular plate shape is disposed on a lower side of the second plate, and the protruding portion that protrudes upward from the flange portion;
a recessed portion into which the protruding portion is inserted is formed on a surface on a lower side of the second plate;
the first plate includes a first tubular portion having a substantially cylindrical shape, and the first tubular portion protrudes toward the lid member with the filter element inserted into the filter case;
the lid member includes a second tubular portion and ribs, and the second tubular portion is configured to be inserted into a hollow portion of the first tubular portion;
when the second tubular portion is inserted into the first tubular portion, the ribs are disposed along an outer circumferential surface of the first tubular portion;
a position of the first tubular portion overlaps with a position of one of the ribs in plan view;
a second recessed portion is formed on the one of the ribs such that a part where the one of the ribs overlaps with the first tubular portion is cut out; and
with the lid member attached to the first plate, a bottom surface of the second recessed portion is adjacent to a distal end of the first tubular portion.

2. The filtration device according to claim 1, wherein
the first tubular portion includes a small-diameter portion provided on a distal end side and a large-diameter portion provided on a base side,
the small-diameter portion has an outer diameter smaller than an outer diameter of the large-diameter portion,
the second recessed portion is formed on the one of the ribs such that a position of the one of the ribs overlaps with a position of the small-diameter portion and a part where the rib overlaps with the small-diameter portion is cut out in plan view, and
with the lid member attached to the first plate, the ribs are disposed along an outer circumferential surface of the small-diameter portion and distal ends of the ribs are adjacent to a planar portion formed between the small-diameter portion and the large-diameter portion.

3. The filtration device according to claim 1, wherein
the first tubular portion includes projections protruding outward in a radial direction,
the ribs are provided with notches, and
with the lid member attached to the first plate, the second tubular portion is inserted into the first tubular portion and the projections are inserted into the notches.

4. The filtration device according to claim 1, wherein
the protruding portion has a substantially cylindrical shape.

5. The filtration device according to claim 2, wherein
the first tubular portion includes projections protruding outward in a radial direction,
the ribs are provided with notches, and
with the lid member attached to the first plate, the second tubular portion is inserted into the first tubular portion and the projections are inserted into the notches.

6. The filtration device according to claim 2, wherein
the protruding portion has a substantially cylindrical shape.

7. The filtration device according to claim 3, wherein
the protruding portion has a substantially cylindrical shape.

8. The filtration device according to claim 5, wherein
the protruding portion has a substantially cylindrical shape.

* * * * *